US012339063B2

(12) United States Patent
Fux et al.

(10) Patent No.: US 12,339,063 B2
(45) Date of Patent: Jun. 24, 2025

(54) METHOD FOR DRYING BULK MATERIALS, IN PARTICULAR SOLIDS, SUCH AS GRANULATES, POWDERS, GRAINS, FOILS, SHAVINGS OR THE LIKE, PREFERABLY PLASTIC GRANULATE

(71) Applicant: Wittmann Technology GmbH, Vienna (AT)

(72) Inventors: Erhard Fux, Michelhausen (AT); Dieter Kremer, Marienheide (DE)

(73) Assignee: Wittmann Technology GmbH, Vienna (AT)

( * ) Notice: Subject to any disclaimer, the term of this patent is extended or adjusted under 35 U.S.C. 154(b) by 512 days.

(21) Appl. No.: 17/616,746

(22) PCT Filed: Jun. 8, 2020

(86) PCT No.: PCT/AT2020/060233
§ 371 (c)(1),
(2) Date: Dec. 6, 2021

(87) PCT Pub. No.: WO2020/247992
PCT Pub. Date: Dec. 17, 2020

(65) Prior Publication Data
US 2022/0341662 A1 Oct. 27, 2022

(30) Foreign Application Priority Data
Jun. 12, 2019 (AT) ............................... A50524/2019

(51) Int. Cl.
*F26B 17/14* (2006.01)
*F26B 3/06* (2006.01)
(Continued)

(52) U.S. Cl.
CPC ................ *F26B 17/14* (2013.01); *F26B 3/06* (2013.01); *F26B 21/12* (2013.01); *F26B 25/002* (2013.01); *F26B 2200/08* (2013.01)

(58) Field of Classification Search
CPC .. F26B 17/14; F26B 3/06; F26B 21/12; F26B 25/002; F26B 2200/08; F26B 21/06; F26B 17/12
See application file for complete search history.

(56) References Cited

U.S. PATENT DOCUMENTS 4,870,760 A 10/1989 Graeff
5,688,305 A 11/1997 Graeff
(Continued)

FOREIGN PATENT DOCUMENTS

AT 505 391 A4 1/2009
DE 36 25 013 A1 1/1988
(Continued)

OTHER PUBLICATIONS

International Search Report issued in International Patent Application No. PCT/AT2020/060233, dated Sep. 1, 2020, along with an English translation thereof.
(Continued)

*Primary Examiner* — Jessica Yuen
(74) *Attorney, Agent, or Firm* — GREENBLUM & BERNSTEIN, P.L.C.

(57) ABSTRACT

A method for drying bulk material, in particular solids, preferably for plastics-processing machines, in drying devices and containers, interconnected to form an assembly. Depending on the material used, the drying time specified, is transmitted or set by the operator or present in the controller. A consumer transmits the material consumption or the shot weight per production cycle, respectively, or the individual or cumulated shot weights for several production
(Continued)

cycles or other values indicative of the material consumption to the drying device(s) and/or material container(s). Each material container consists, on the control side, of several loading batches, preferably with time stamps, and the drying or residence time, respectively, for the respectively lowest loading batch in the material container results from the difference between the current time of the respective material removal by the consumer and the time stamp associated with the oldest loading batch.

16 Claims, 5 Drawing Sheets

(51) Int. Cl.
*F26B 21/12* (2006.01)
*F26B 25/00* (2006.01)

(56) References Cited

U.S. PATENT DOCUMENTS

| | | | | |
|---|---|---|---|---|
| 2006/0168843 | A1 | 8/2006 | Zlotos | |
| 2012/0324756 | A1 | 12/2012 | Fux | |
| 2013/0000123 | A1 | 1/2013 | Fux | |
| 2013/0091723 | A1* | 4/2013 | Graeff | F26B 21/083 34/572 |

FOREIGN PATENT DOCUMENTS

| | | | |
|---|---|---|---|
| DE | 44 37 494 | A1 | 4/1996 |
| DE | 197 57 537 | A1 | 7/1999 |
| EP | 2 542 846 | B1 | 5/2014 |
| EP | 2 542 847 | B1 | 5/2014 |
| EP | 3 034 975 | A1 | 6/2016 |
| EP | 3 258 197 | | 12/2017 |
| EP | 3 258 198 | | 12/2017 |
| JP | 2012-063072 | | 3/2012 |

OTHER PUBLICATIONS

Written Opinion of the International Searching Authority issued in International Patent Application No. PCT/AT2020/060233, dated Sep. 1, 2020.

* cited by examiner

METHOD FOR DRYING BULK MATERIALS, IN PARTICULAR SOLIDS, SUCH AS GRANULATES, POWDERS, GRAINS, FOILS, SHAVINGS OR THE LIKE, PREFERABLY PLASTIC GRANULATE

BACKGROUND

1. Field of the Invention

The invention relates to a process for drying bulk material, in particular solids, such as granule materials, powders, grains, films, chips, or the like, in particular for the plastics-processing industry, as described in the preamble of claim 1.

2. Description of the Background

As is known per se, before processing in a machine, for example in an injection-molding machine, most types of plastic granules must be dried.

Drying plants for producing a dried or heated gaseous medium stream, in particular air, for plastics-processing machines are known from the prior art, wherein one or several drying vessels are connected to the drying plant and a dried gaseous medium, in particular air, flowing through the drying vessel or vessels is provided for drying the plastic material. One or several process heaters or air heaters are provided upstream of the drying vessel or vessels. The return air leaving the respective drying vessel is fed back to the drying plant via an individual return air line or a collecting line for several drying vessels.

For example, AT 505 391 B1 discloses a process for drying bulk material, preferably plastic granules, in which the bulk material is dried in a drying vessel by means of an air stream. The exhaust air stream or return air, respectively, leaving the drying vessel is dried in a drying cell containing a desiccant or adsorbent; if necessary, the adsorbent is regenerated and fed to the bulk material as a dry air stream.

Another process and apparatus for drying moist gases is known from DE 44 37 494 A1.

DE 36 25 013 A1 likewise discloses a process and a device for drying bulk material, preferably plastic granules, in a drying vessel by means of dry air. In the course of this process, the exhaust air leaving the drying vessel is dried in a dryer containing an adsorbent and fed back to the bulk material as dry air.

Furthermore, a process and an apparatus for drying and heating air that serves for drying bulk material is known from DE 197 57 537 A1. This device consists essentially of at least one drying cartridge or drying cell, respectively, a downstream air heater, a downstream drying vessel and a downstream cooling device.

For the sake of completeness, it should be mentioned that a drying plant can also exist comprising no drying cartridge but the other components, i.e. air heater and a downstream drying vessel.

Other geometries of the drying cartridge are also possible, as can be seen, for example, in EP 2 542 846 B1 and EP 2 542 847 B1 by the present applicant. This describes a segment wheel dryer with a rotating drum in which the moist air is removed from the container for the bulk material, dried, and returned to the container.

A disadvantage of all known methods is that the required drying performance for the respective drying vessel can be determined only indirectly and with the aid of additional sensors, preferably temperature sensors. Necessary changes in drying performance can be detected only with a delay, since it is in the nature of temperature sensors to have a slow response behavior. Moreover, detection of a trend of a temperature value requires a longer observation period, which causes an additional delay in the control behavior. Preferably, the behavior of the temperature differential between supply air to and return air from the material container is used to determine the drying performance.

Fluctuating drying performance results from varying production requirements, e.g. when additional processing machines are connected to the same drying vessel for material supply or when a processing machine experiences a production stoppage. Similarly, loading a drying vessel with cold or moisture-saturated plastic material suggests a higher drying performance, even though the material throughput through the drying vessel may be unchanged. Sensitive plastic materials can suffer thermal damage if overdried. If drying is insufficient, on the other hand, the moisture contained in the plasticized material stream will cause quality problems, e.g. streaks in the plastic part produced.

For the drying process, manufacturers of plastic material typically define the residence time and process temperature of the respective material in the gaseous medium stream that is dried and/or heated to the appropriate temperature. The residual moisture values of the material at a defined initial moisture of the materials that is not to be exceeded can be taken from data sheets of the manufacturers. It goes without saying that these specifications are taken into account in the dimensioning of a drying plant. This determines the size of the respective material containers and the required ventilation system performance of the drying device. Operation is then based on compliance with the residence time of the material, since it is not possible to easily determine the actual residence time. If more consumers are connected to a material container than originally intended and dimensioned accordingly, a shortfall in the residence time of the material will occur in the following. Improper operation of a drying plant becomes apparent only in terms of defectively produced parts. Thus, it would be advantageous to know the actual residence time of the material in the drying vessel.

SUMMARY

It is the objective of the present invention to create a process for drying bulk material, in particular solids, such as granule materials, powders, grains, films, chips, or the like, preferably plastic granules, of the type mentioned at the beginning, with which, on the one hand, the disadvantages described above are avoided and, on the other hand, the material quality of the bulk material to be made available is kept constant or increased, respectively.

The objective is achieved by the invention.

The method according to the present invention is characterized in that, depending on the material or bulk material used, respectively, the drying time specified by the manufacturer or set by the user, in particular the residence time (45), is either transmitted by a superordinate controller or by the consumer, or is set in the controller of the container or of the drying device by the operator, or is present in the controller of the container or of the drying device in the form of a local database, wherein the consumer transmits the material consumption or the shot weight per production cycle, respectively, or the individual or cumulated shot weights for several production cycles or other values which are indicative of the material consumption, to the drying device(s) and/or material container(s), directly or indirectly via the superordinate controller, wherein each material container consists on the control side of several loading batches, preferably with time stamps, and for the respectively lowest loading batch, in particular material batch, in the material container, the drying or residence time results from the difference between the current time of the respective material removal by the consumer and the time stamp associated with the preferably oldest loading batch. For high quality of the injection-molded parts, it is essential that the residence time or drying time required for the particular bulk material and specified by the material manufacturer's data sheets can be precisely calculated and thus monitored for each material batch required by the consumer, preferably one or several plastics-processing machines. If the residence time is too long due to a standstill of the consumer(s) or process-related due to lower material consumption of one or several consumers, various strategies known per se can be initiated to adjust the drying process. Thus, the set process temperatures in the container(s) or the loading of the container(s) with material or bulk material, respectively, or the air volume of the drying device(s) can be automatically adapted, based on the transmission of at least the material consumption from the consumer, to the drying device(s) or material container(s). A new feature is that it is also possible to detect situations where the residence time is too short and thus the material underdried. This occurs whenever consumers withdraw too much material from the drying vessel(s) and the material residence or drying time specified by the material manufacturers can no longer be met. If, due to the size of the equipment and devices, it is not possible to increase the volume of dry air or to increase the loading of the material containers, a possible fault condition exists which must be indicated to the consumer(s) or user(s) accordingly.

Advantageously, here the residence time of the bulk material in the drying vessel can be calculated from the consumption data reported by the plastics-processing machine, e.g. shot weight per cycle or material consumption per unit, and the loading batches of the material container(s) managed in the material container(s) or in the drying devices on the control side. The calculation of the residence time is based on the first-in-first-out flow principle of bulk material in the drying vessel, as well as the determined or set, in any case known size of container and the bulk material conveying device for loading the container. Typically, bulk material conveying devices are much smaller in volume than drying vessels are, e.g., in ratios of 1:20 up to 1:60 or even above. On the control side, a drying vessel thus consists of several loading batches, which are time-stamped and held in a ring buffer. The size of the ring buffer, i.e. the number of line entries, corresponds approximately to the ratio of the size of the drying vessel to the size of the bulk material conveying device. The respectively "oldest" loading batch in the ring buffer is used to calculate the residence time of the material. In discontinuous operation, as is the case with an injection-molding machine, for example, the consumer reports the corresponding material consumption for each injection cycle via various physical variables. The residence time of the respectively lowest material batch in the material container that is used for the injection-molding cycle results from the difference of the current time at the time of the consumer's demand and the time stamp of the oldest loading batch in the ring buffer. In the case of continuous material consumption, as is the case with extrusion facilities, for example, the reporting by the consumer is done either cyclically from time to time or when there is a change in material consumption. Such a method for drying bulk material is generally used in plastics-processing engineering, in particular for injection molding and in extrusion technology, whereby the information of the required bulk material is adapted accordingly, i.e. in injection-molding technology it can take place after each injection molding cycle, whereas in extrusion technology the transmission takes place continuously at adjustable times.

In order to keep the residence time at the value specified by the manufacturer and thus prevent overdrying or unnecessarily high energy consumption, from among various strategies for adjusting the drying performance or air flow a selection can be made depending on the equipment of the drying device and the drying vessels. These strategies can be selected manually by predefined selection or automatically. Likewise, any combination of these strategies is possible.

In the standard case, when the residence time in the container(s) specified or determined for the respective plastic or bulk material, respectively, is exceeded, the process temperature is changed to a selectable or automatically determined value, preferably reduced. This ensures that if the material demand is too low and the residence time in the container therefore too long, the temperature for the bulk material or plastic, respectively, is reduced so that the plastic in the container is prevented from drying out. This can often occur when a fault occurs in one or several consumers during the process cycle or the latter have been switched off, or a production stop has occurred. Thermal degradation occurs in many over-dried plastics, resulting in a defective plastic part, such as loss of strength, embrittlement, discoloration or cracking. In addition, additives bound in the plastic can be released by overdrying and get back into the drying unit via the return air line and cause a negative effect on the drying process by sticking and blocking filters and desiccants.

Another strategy is to regulate the air volume flow through the hopper using a damper, which functions in a manner similar to a proportional valve and is typically placed in the upstream airflow. While this does not reduce the residence time of the material in the drying vessel, it does adjust the air volume that passes by the material in question, limiting the ability of the material to absorb moisture. The excess air is returned to the drying unit via a bypass valve. Since this air is not loaded with moisture, there is no energetic expenditure for dehumidification in the drying unit.

In case of one or several drying devices equipped with a frequency converter to vary the air volume, the air volume flow can be directly influenced, thus reduced or increased, hence produce an effect similar to that of the damper.

Another method directly affects the amount of bulk material in the storage system of the container. Thus, when material consumption increases in the next process cycle or cycles, respectively, the volume in the storage system is increased, whereas when the required bulk material is reduced, the volume in the storage system is reduced in order to prevent the bulk material from remaining in the storage system for too long, i.e., the loading volume of the container is constantly adjusted to the required quantity, whereas in the prior art, care is taken to ensure that there is always sufficient bulk material available and the loading volume is kept constant.

Another significant advantage results from the fact that a too short residence time of the material can also be detected and a corresponding error message displayed to the operator after an adjustable or fixed time has elapsed.

Advantageous embodiments are those in which both the consumer, preferably one or several injection-molding machines, and the drying device(s) and material container(s) function autonomously from each other and are interconnected via communication interfaces. This makes it possible for the drying devices and material containers to be brought to the respective processing machine, ensuring optimal bulk material supply for all work cells in the industrial installation.

Advantageously, the drying device or devices and material containers also calculate the residence time of the material or bulk material, respectively, present in the container or containers from the transmitted material throughputs or shot weights per production cycle or cycles. This ensures that the bulk material processing devices, in particular the injection-molding machines, are provided with optimum bulk material quality for further processing. This is advantageous as the plasticization of the bulk material is essential for injection-molded components, so that no over-dried bulk material, which occurs when the residence time in the container is too long, or too moist bulk material, which is produced when the residence time in the container is too short, is conveyed to the plastics-processing machines.

Advantageous embodiments are such in which both the consumer, preferably one or several injection-molding machines, and the drying device(s) and material container(s) function autonomously from each other and are mutually interconnected via communication interfaces. This allows calculation of the residence time or other states to be determined or calculated, respectively, at any time, independent of the consumer's production cycle.

Advantageous embodiments are such in which the controller or controllers of the drying device or devices or of the material container or containers hold the respective entries for the loading batches, at least the time stamps, in the form of a ring buffer. This ensures that the controller can compare the residence times with those specified by the manufacturer and react at any time in order to maintain the specified residence times for optimum quality of the plastic part to be produced.

Advantageous embodiments are such in which a new loading batch and thus an entry in the ring buffer for a specific material container results from a conveying cycle of the bulk material conveying device (9) associated with the loading of this material container. This ensures that more bulk material can be conveyed to the storage system for drying in one conveying cycle than is required in one production cycle or injection molding cycle of the injection-molding machine, respectively.

Advantageous embodiments are such in which the current material consumption transmitted by the consumer is subtracted from the respectively oldest loading batch in the ring buffer until this loading batch is completely used up, whereby the next oldest loading batch, i.e. the next entry in the ring buffer, is subsequently used for the calculation. This means that, on the one hand, the used-up loading batch can be assigned to the plastic parts produced for quality records and, on the other hand, the material quantity of one, in particular the oldest, loading batch is known at any time, so that the controller can determine whether the next production cycle can still be carried out with the oldest loading batch or whether further material from the next loading batch is to be used. If, however, the next loading batch has not yet reached the required residence time, the controller can issue a corresponding message, so that either the production cycle is stopped or the produced part is marked or flagged, respectively, in order to subsequently subject it to a quality check.

However, advantageous embodiments are also such in which the minimum number of loading batches of a ring buffer results from the ratio of the volume of the material container and the volume of the associated bulk material conveying device.

Advantageous embodiments are such in which the physical size of a loading batch results from the volume of the bulk material conveying device assigned to a material container, from which the material consumption transmitted by the consumer is subtracted in each case.

However, advantageous embodiments are also such in which the drying device(s) can select from among various strategies for drying the material in the container(s) by predetermined selection or automatically when the predetermined or determined residence time of the material or bulk material, respectively, is not reached or exceeded. This ensures that the specified residence time of the granules used is not exceeded, thus guaranteeing optimum quality of the injection-molded part to be produced.

Advantageous embodiments are such in which the process temperature is changed, preferably reduced, to an adjustable or automatically determined value during the period when the residence time in the container(s) specified or determined for the respective plastic or bulk material, respectively, is exceeded. This prevents the bulk material in the material container from becoming too dry.

Advantageous embodiments are such in which the drying device or devices, which are equipped with a frequency converter for changing the air volume or air quantity, respectively, automatically change the air volume through the container or containers during the period in which the air volume falls below or exceeds the residence time specified or determined for the respective material.

Advantageous embodiments are such in which a material container equipped with a throttle valve, for varying the air volume (47) flowing through this container, automatically varies the air volume through the container during the period in which the residence time specified or determined for the respective material is undershot or exceeded. This allows a simple and effective design.

Advantageous embodiments are those in which the material supply or the amount of bulk material in the material container(s), respectively, can be automatically adjusted to the predetermined residence time in order to achieve an optimal and constant residence time in the material container for the respective material.

However, advantageous embodiments are also such in which an error message can be generated after an adjustable or fixed period of time if the residence time falls below the value specified or determined for the material in question. This prevents, on the one hand, products manufactured with this material from being subsequently inspected for quality, or the corresponding material or plastic parts from being disposed of.

Finally, advantageous embodiments are also such in which the size of the container or containers is adjustable or determinable and thus the total supply of material in the container or containers can be determined. As a result, however, different maximum volumes of material to be filled can be defined for the same design of the container, i.e. a standardized storage system in the container is used for the most varied designs, but a different size of the container can be defined via the settings.

As a matter of principle, it should be mentioned that the previously described process sequences can be combined with one another in any way.

BRIEF DESCRIPTION OF THE DRAWINGS

The invention is now explained in more detail by means of an exemplary embodiment shown in the drawings, wherein the invention is not limited to the illustrations shown, in particular not to the structure and design of the systems.

The figures show.

DETAILED DESCRIPTION

Figure 1:
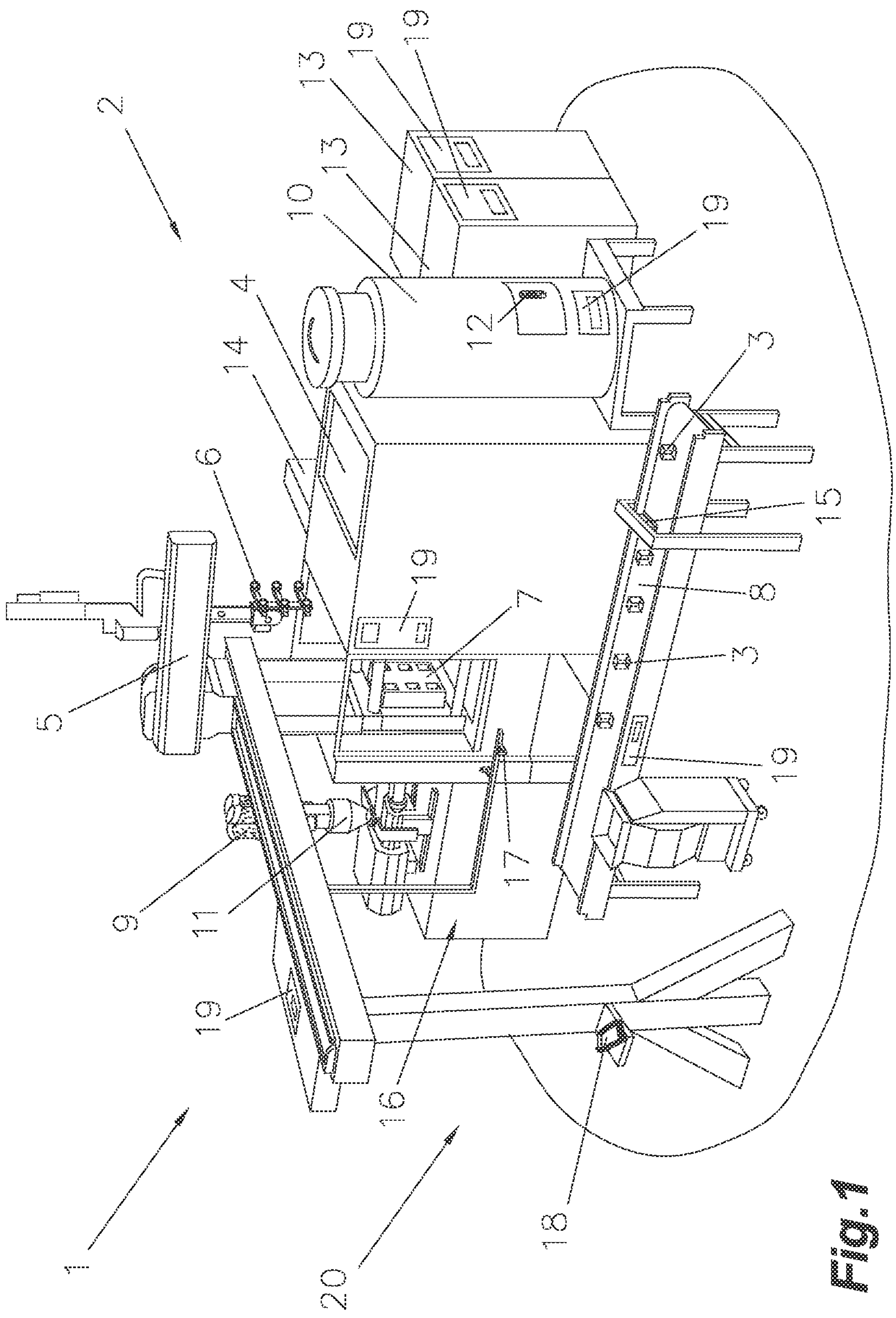
FIG. 1—an overview illustration of a plastics-processing industrial installation in a work cell; simplified, for illustrative purposes only.
Figure 2:
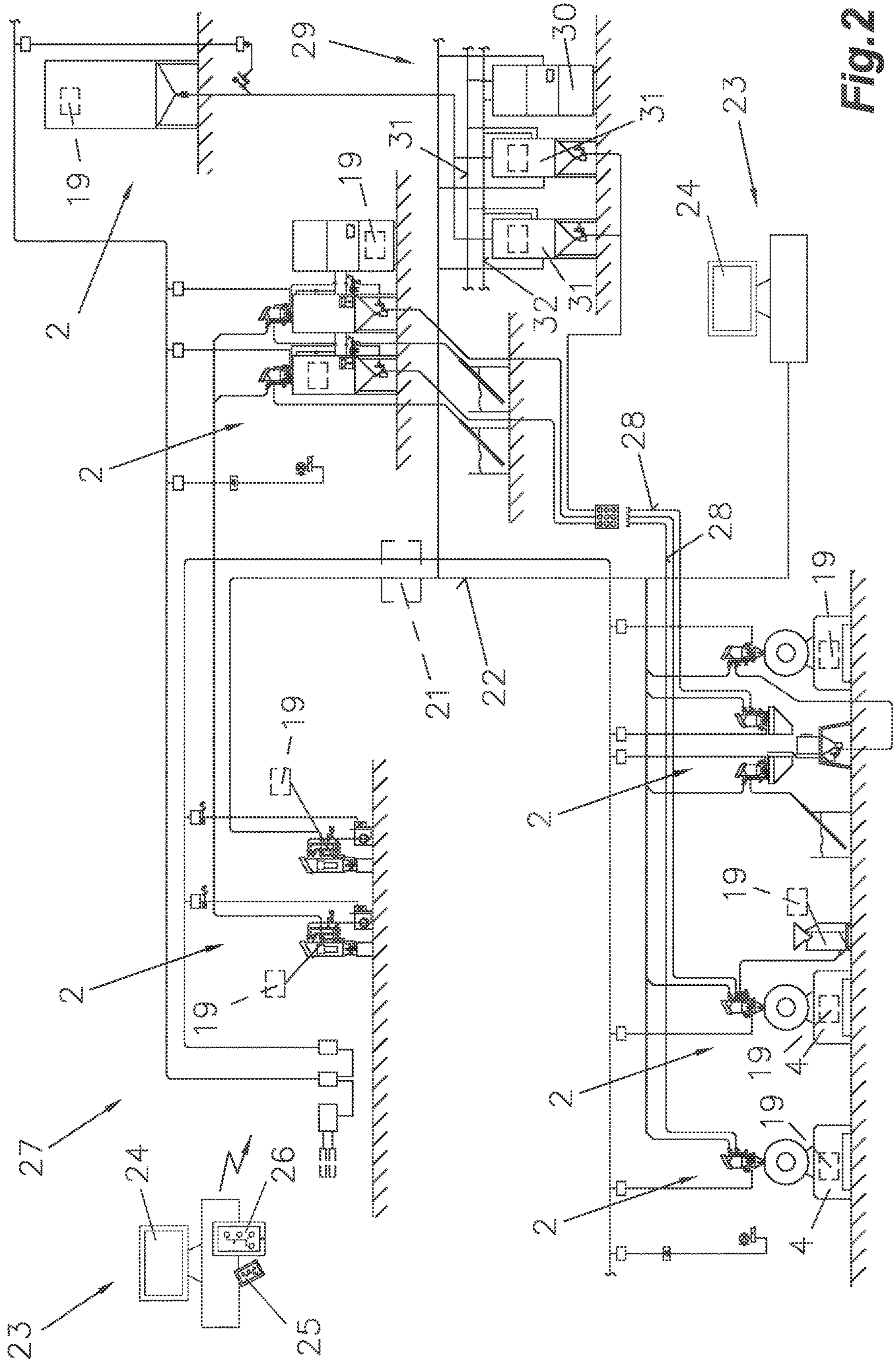
FIG. 2—a schematic representation of a plastics industry system whose production resources are connected as part of a central conveyor system; simplified, for illustrative purposes only.

It should be stated by way of introduction that, in the individual embodiments, the same parts are provided with the same reference numbers or same component designations, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

FIGS. 1 to 5 show an industrial installation 1 for plastics applications, in which the individual production resources 2 for producing one or several products/semi-finished products or injection-molded parts 3 are connected.

For example, it is possible that for the production of an injection-molded part 3 plastic granules or powder are fed to the processing machine 4 via a granule conveyor 9 and possibly via an upstream or downstream metering device 11 and/or from an upstream granule dryer. By means of a temperature control unit 13 and/or cooling unit, the injection mold 7 can be kept at operating temperature by feeding a temperature control medium, heated or cooled accordingly, respectively, so that optimum processing of the injected molded part 3 in the injection mold 7, is made possible.

In addition, the system can be equipped with a monitoring device 15, in particular a camera system, in order to be able to carry out an automatic quality control of the manufactured product 3. Very often there are also upstream or downstream automation systems 16 present, e.g. sprue cutter 17, centering, separating, feeding, crate and pallet stacking stations, etc., which are directly integrated into the robot controller or industrial installation 1, respectively, and controlled by it via digital or analog signals or other communication interfaces. The creation of the flow and control logic for the robot 5 or handling robot 5, respectively, and any connected automation components 16 or systems, respectively, is typically carried out in a teach-in procedure, for which an appropriate teachbox 18 or robot controller, respectively, can be used.

In order for the individual devices to be adjustable or programmable, respectively, they are preferably equipped with corresponding control electronics or controller, respectively, 19, as shown schematically, wherein the setting or programming, respectively, is entered and displayed via displays arranged on the devices or the teachbox 18. Of course, it is also possible to program or adjust, respectively, the devices via an external component connected to the production resources 2 via an interface.

For the sake of completeness, it is also mentioned that all devices are connected to corresponding lines, in particular power supply, network and connection lines, liquid supply lines, material lines, etc., which in the interest of clarity were not displayed in the representation shown. Moreover, such production resources 2 are preferably combined into one or several work cells 20, wherein the communication of the production resources 2 within the work cells 20 can be directly done with the machine 4 or via a work cell controller 21. In this context, the industrial installation can have one or several control rooms 23, in which, in particular, one or several control units 24 or computers, respectively, can be arranged, whereby cell phones 25 and/or tablets 26 can also be used. To ensure that the plastics-processing production resources 2 are supplied with bulk material 12, the corresponding production resources 2 can be supplied via a central conveyor system 27, as shown for example in FIG. 2, via corresponding supply lines 28.

Figure 3:
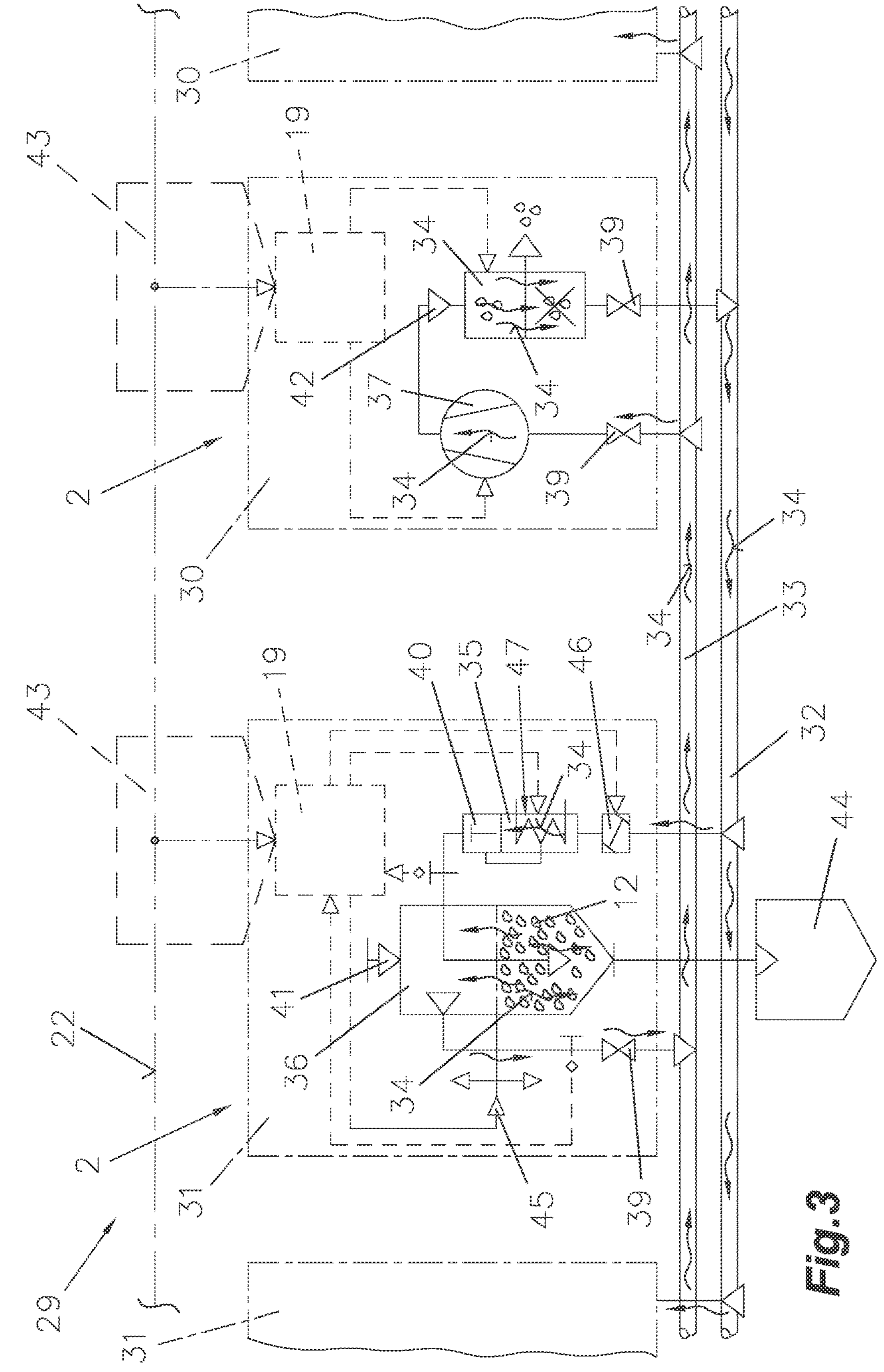
FIG. 3—schematic illustration of the design of the drying plant; simplified, for illustrative purposes only.

Here FIG. 3 shows a detail of the design of a drying plant 29 for illustrating the process for drying bulk material 12, in particular solids, such as granule materials, powders, grains, films, chips, or the like, preferably plastic granules in a single drying device or several drying devices 30 and containers 10, 31, in particular material containers 10, 31, connected together to form an assembly. Alternatively, the drying devices can be referred to as dryers.

As mentioned before, the production resources 2, in particular the drying device 30 and the container 10, 31 are connected via a line 22 for communication via their controllers 19, whereby the controller 19 controls or regulates, respectively, the individual devices.

Furthermore, all drying devices 30 and containers 10, 31 located in the drying plant 29 are mutually interconnected via an air supply line 32 and air return line 33. In this process, the drying devices 30 dehumidify the moist air 34 and then feed dry air 34 into the air supply line 32 so that it is taken from the containers 10, 31 for drying the bulk material 12 and heated accordingly by a process heater 35 and subsequently conveyed through the storage system 36 filled with granules 12 so that the air 34 can absorb the moisture of the bulk material 12, whereupon the moist air 34 is fed into the air return line 33. This allows the drying equipment 30 to remove the moist air 34 from the air return line 33 and deliver it via a pump/compressor 37 to a drying device 30, which removes the moisture in the air 34. For the extraction and supply of air 34, the individual devices are equipped with flaps or valves 39, which are controlled accordingly via the controller 19.

According to the present invention, it is now envisioned that a process temperature 40 set for the respective material 12 or bulk material 12 in the container(s) 10, 31 or the loading 41 of the container(s) 10, 31 with material 12 or bulk material 12, respectively, or the air volume 42 of the drying device(s) 30 is adapted on the basis of the transmission of at least the material consumption 43 from the consumer or production resources 2 preferably one or several plastics-processing machines to the drying device(s) 30 or containers 10, 31, i.e., that all consumers or production resources, respectively, which require or process, respectively, bulk material 12 communicate the material consumption 43, so that the drying process can be adapted accordingly to the conditions by the drying device or devices 30 or containers 10, 31.

In order to ensure a smooth supply of sufficient dry bulk material 12, the consumers or production resources 2 transmit their material consumption or shot weight per production cycle or the individual or cumulated shot weights for several production cycles to the drying device or devices 30 and material containers 10, 31, which are further processed by their controller 19, i.e., the required material consumption 43 is determined or calculated, respectively, from all the transmitted data, so that a corresponding controller or regulator, respectively, is carried out to increase or decrease the required dry bulk material 12. Here, the container 10, 31 and/or the drying device 30 can determine or calculate, respectively, a residence time 45 of the bulk material 12 present in the storage system 36 of the container 10, 31 to prevent an excessively short or unnecessarily long storage time 46 for optimal plasticizing and material properties of the bulk material 12. Indeed, if the bulk material 12 is dried for too long and/or at too high temperatures, for example, it may result in the bulk material 12 becoming too dry and no longer being able to be optimally processed by the plastics-processing machines, which may lead to defective production parts. In the process, the controllers 19 also include other parameters, such as the material type or type of plastic, respectively, material size, etc.

It is essential that, depending on the material or bulk material, respectively, 12 used, the optimum residence time is either transferred by a superordinate controller or database, or is set by the operator in the controller 19 of the container 10, 31 or of the drying device 30, or is available in the controller 19 of the container 10, 31 or of the drying device 30 in the form of a local database.

As previously mentioned, a wide variety of control and regulating methods can be used, with the paramount goal always being to provide consistent bulk material quality to the plastics-processing devices.

In this context, it is possible that different materials 12 or bulk materials 12, respectively, are processed, in particular dried, in different containers 10, 31, in particular in their storage system 36, the parameters of which, in particular the process temperature 40, can be set for each container 10, 31, i.e., the individual containers 10, 31 supplied with different bulk material 12 can have different parameters which are regulated or controlled, respectively, independently of one another, so that a bulk material 12 of consistently equally good quality is always made available for further processing. In this context, it is also possible for several containers 10, 31 to be connected in parallel in the drying plant 29, as this allows more material 12 and thus more consumers to be supplied simultaneously.

As shown schematically in FIG. 3 by a dashed arrow 43 in the area of the line 22, the consumer(s) 2 transmit(s) the material throughput 43 or the shot weight per production cycle, respectively, or the individual or cumulated shot weights for several production cycles or other values that directly or indirectly indicate the material throughput to the drying device(s) 30 and/or material container(s) 10, 31. This allows the drying device(s) 30 and/or material container(s) 10, 31 to calculate the residence time 45 of the material or bulk material, respectively, 12 present in the container(s) 10, 31 from the transmitted material throughputs or shot weights per production cycle or cycles.

Figure 4:
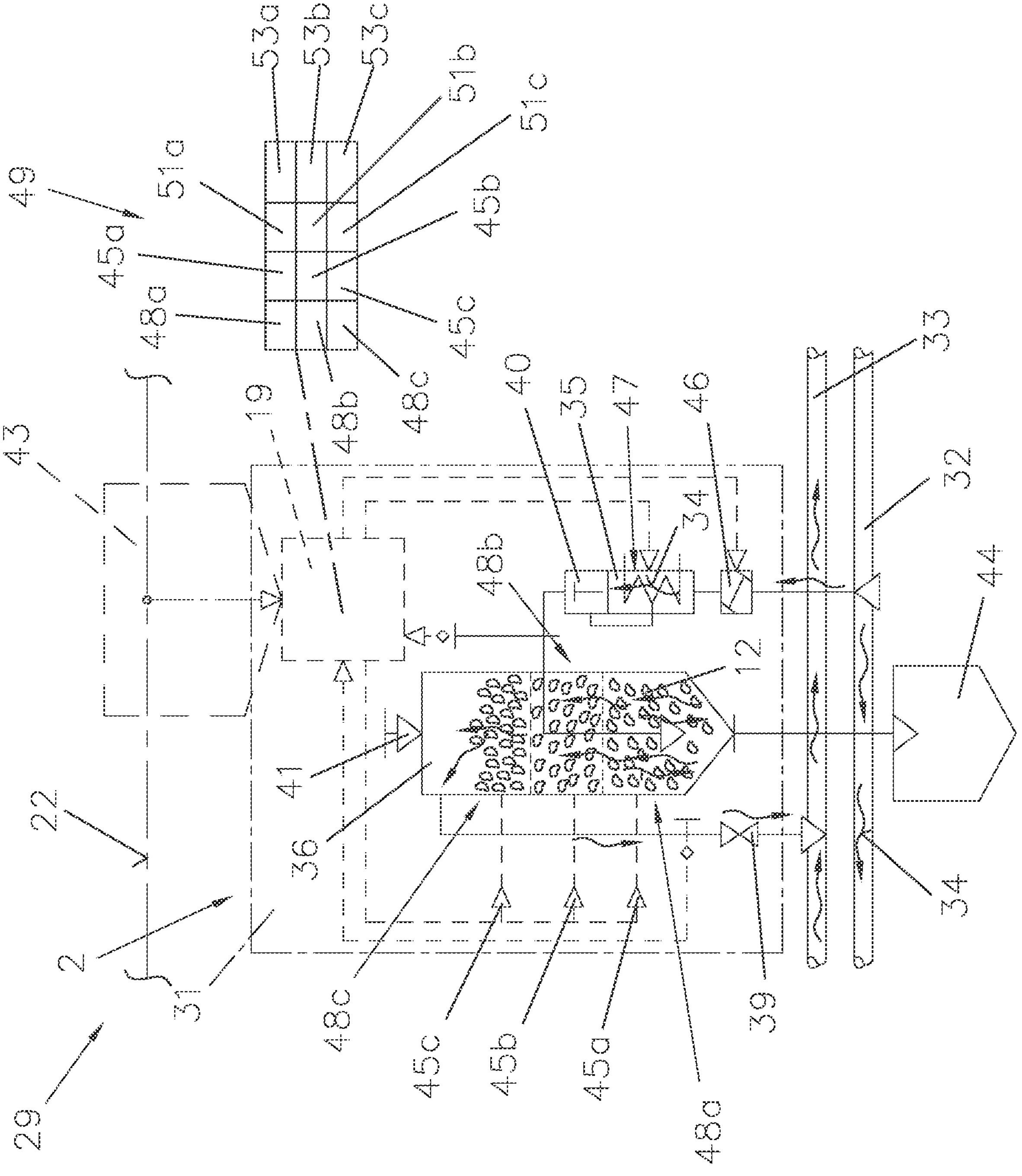
FIG. 4—a schematic representation of a material container of a drying plant with several loading batches; simplified, for illustrative purposes only.

FIG. 4 schematically shows the relationship between ring buffer 49 and loading batch 48,48*a*,48*b*,48*c*. On the control side, the ring buffer 49 serves for storage and management of the time stamps 50, in particular the time stamps 50*a* to *c* of the most varied loading batches 48*a* to *c*, and possibly further information, e.g. size of the loading batch 48*a* to *c*, the effective drying time 51*a*,51*b*,51*c* of a loading batch 48*a* to *c* or additional information 53*a*,53*b*,53*c*, of the loading batches 48*a* to *c*. A new loading batch 48, on the control side in the ring buffer 49 and physically in the material container 10, 31, results from a material conveying cycle of a conveying device 9, which can be referred to as a conveyor, which is mounted on the material container 10, 31. The current time and optionally further information is stored in an entry in ring buffer 49. The physical loading batches 48*a* through *c* are schematically indicated in FIG. 4 by different orientations of the bulk material grains and are different layers, as schematically separated by dashed lines, in the material container 10, 31. By design, the material moves through a material container 10, 31 according to the FIFO (First-In, First-Out) principle. The respectively "oldest" loading batch 48*a* in the ring buffer 49 is used to calculate the residence time 45 of the material. In discontinuous operation, as is the case with an injection-molding machine, for example, the consumer reports the corresponding material consumption for each injection cycle via various physical variables. The residence time 45*a* of the respectively lowest material batch 48*a* in the material container 10, 31 that is used for the injection-molding cycle results from the difference of the current time at the time of the consumer's demand 2 and the time stamp 50*a* of the oldest loading batch in the ring buffer 49.

If such a drying plant is used for the operation of an extrusion facility, the material consumption is preferably transmitted continuously and at presettable time intervals in order to determine the residence time 45.

Figure 5:
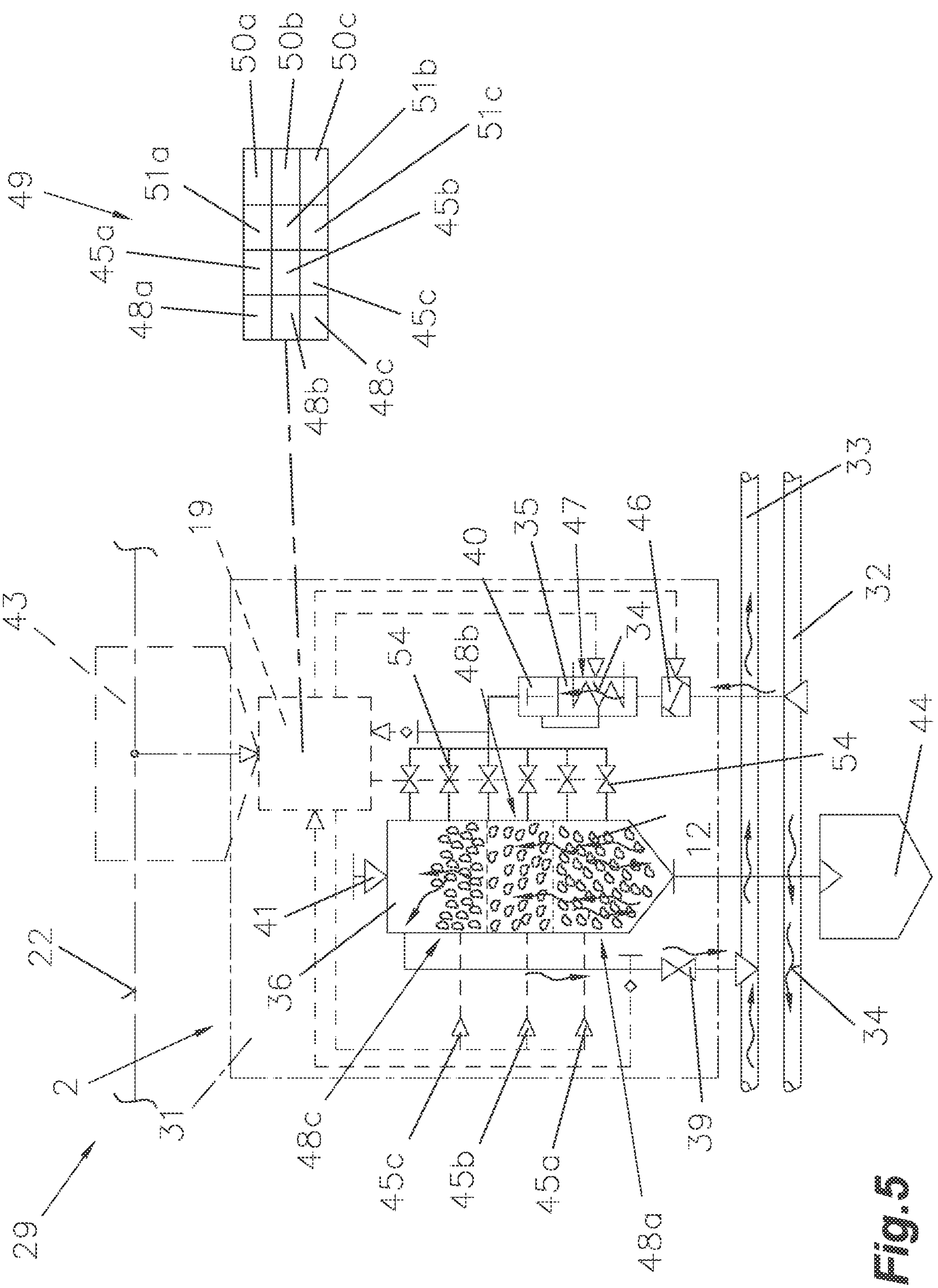
FIG. 5—a further schematic representation of an embodiment of a material container of a drying plant with several inflow points for the supply of air to different areas, in particular to the loading batches; simplified, for illustrative purposes only.

Furthermore, it is possible, as shown schematically in FIG. 5, that the air supply for the most diverse loading batches 48,48*a* to 48*c* can be controlled or regulated, respectively, i.e. that several inflow points 54 for the supply of the dried air 34 are arranged on the container 10,31, in particular on the storage system 36, so that the required air 34 is fed in per calculated residence time 45,45*a* to *c* of the most diverse loading batches 48,48*a* to *c*. For example, it is possible that the air supply is reduced for the oldest, i.e. lowest, loading batch 48*a* and increased for the next loading batch or loading batches 48*b*, 48*c*, respectively.

As previously stated, if the material or bulk material 12 falls below or exceeds the predetermined or determined residence time 45,45*a*,45*b*,45*c*, the drying device or devices 30 may select from among various strategies for drying the material, respectively, 12 in the container or containers 10, 31 by predetermined selection or automatically. In this context, for example, the process temperature 40 can be changed, preferably reduced, to an adjustable or automatically determined value during the duration of an exceedance of the residence time 45,45*a*,45*b*,45*c* in the container(s) 10, 31 predetermined or determined for the respective plastic or bulk material 12, respectively. However, it is also possible for a material container 10,31 equipped with a throttle valve 46 for varying the air volume 47 flowing through said container 10,31 to automatically vary the air volume through the container during the period of time when the residence time 45,45*a*,45*b*,45*c* predetermined or determined for the particular material 12 is not reached or exceeded. In this regard, it is also possible for the drying device or devices 30, which are equipped with a frequency converter for changing the air volume or air quantity, respectively, 42, to automatically change the air volume 42 through the container or containers 10, 31 for the duration of an undershoot or exceedance of the residence time 45 specified or determined for the respective material. Of course, other strategies for drying known from the prior art are possible. It is also possible that, if the residence time 45 specified or determined for the respective material 12 is not reached, an error message can be generated after an adjustable or fixed period of time.

For the sake of completeness, it is pointed out that all devices or production resources, respectively, 2 can be designed as so-called stand-alone devices and thus operate independently of others.

It is pointed out that the invention is not limited to the embodiments shown, but may comprise further embodiments and designs.

The invention claimed is:

1. A method for drying solids bulk material in one or more dryers and material containers that are interconnected to form an assembly, said method comprising:

transmitting a residence time for drying the solids bulk material by way of a superordinate controller or by way of production resources, or is set in a controller of a respective one of the material containers or of the one or more dryers by a user in a form of a local database;

transmitting a material consumption or a shot weight per production cycle, respectively, or an individual or cumulated shot weights for several production cycles or other values indicative of material consumption to the one or more dryers and material containers, directly or indirectly via the superordinate controller;

providing each material container on a control side of several loading batches, with time stamps, and for respectively oldest loading batch residence time results from a difference between the current time of respective material removal by the production resources and a time stamp associated with the oldest loading batch;

keeping the controller or controllers of the one or more dryers and material containers with the respective entries for the loading batches, at least the time stamps in the form of a ring buffer.

2. The method according to claim 1, wherein:

the production resources, at least one injection-molding machine, the one or more dryers and material containers function autonomously from each other and are mutually interconnected via communication interfaces.

3. The method according to the claim 1, wherein:

a new loading batch is entered into the ring buffer for a specific one of the material containers results from a conveying cycle of a bulk material conveyor associated for loading of the specific one of the material containers.

4. The method according to claim 1, wherein:

a current material consumption transmitted by the production resources, is subtracted from a respectively oldest loading batch in the ring buffer until said oldest loading batch is completely used up, whereby a next oldest loading batch, that is a next entry in the ring buffer, is subsequently used for a subtraction calculation.

5. The method according to claim 1, wherein:

a minimum number of loading batches of the ring buffer results from a ratio of a volume of a material container and a volume of an associated bulk material conveyor.

6. The method according to claim 1, wherein:

a physical size of a loading batch results from a volume of a bulk material conveyor associated with a material container.

7. The method according to claim 1, wherein:

the one or more dryers can be selected from among various strategies for drying the solids bulk material in material containers by predetermined selection or automatically when a predetermined or determined residence time of the bulk material, respectively, is not reached or exceeded.

8. The method according to claim 1, wherein:

a process temperature is changed to an adjustable or automatically determined value for a duration of an exceedance of the residence time in at least one of the material containers predetermined or determined for a respective plastic or bulk material, respectively.

9. The method according to claim 1, wherein:

a process temperature is reduced to an adjustable or automatically determined value for a duration of an exceedance of residence time in at least one of the material containers predetermined or determined for a respective plastic or bulk material, respectively.

10. The method according to claim 1, wherein:

the one or more dryers equipped with a frequency converter for varying the air volume or air quantity, respectively, automatically vary air volume through at least one of the material containers for a duration of an undershoot or exceedance of a residence time predetermined or determined for the respective material.

11. The method according to claim 1, wherein:

at least one material container of the material containers is equipped with a throttle valve configured to vary air volume flowing through said at least one material container automatically varies air volume through the at least one material container for a duration of an undershoot or exceedance of the residence time predetermined or determined for the respective bulk material.

12. The method according to claim 1, wherein:

supply or quantity of said solids bulk material in at least one of the material containers can be automatically adapted to a predetermined residence time in order to achieve an optimum and constant residence time in the at least one of the material containers for the solids bulk material.

13. The method according to claim 1, wherein:

if a residence time specified or determined for a respective solids bulk material is not reached, an error message is produced after an adjustable or fixed period of time.

14. The method according to claim 1, wherein:

size of the material containers is configured to be adjustable or determinable and thus a total supply of bulk material in each of the material container is determinable.

15. A method for drying solids bulk material in one or more dryers and material containers that are interconnected to form an assembly, said method comprising:

transmitting a residence time for drying the solids bulk material by way of a superordinate controller or by way of production resources, or is set in a controller of a respective one of the material containers, or of the one or more dryers by a user in a form of a local database;

transmitting a material consumption or a shot weight per production cycle, respectively, or an individual or cumulated shot weights for several production cycles or other values indicative of material consumption to the one or more dryers and material containers, directly or indirectly via the production resources or superordinate controller;

providing each material container on a control side of several loading batches, with time stamps, in a form of a ring buffer and for respectively oldest loading batch residence time results from a difference between a current time of respective material removal by the production resources or superordinate controller and a time stamp associated with the oldest loading batch;

subtracting a current material consumption transmitted by the production resources or superordinate controller from a respectively oldest loading batch in the ring buffer until said oldest loading batch is completely used up, whereby a next oldest loading batch, that is a next entry in the ring buffer, is subsequently used for a subtraction calculation.

16. A method for drying solids bulk material, in one or more dryers and material containers that are interconnected to form an assembly, said method comprising:

transmitting a residence time for drying the solids bulk material by way of a superordinate controller or by way of a production resource or is set in a controller of a respective one of the material containers, or of the one or more dryers by a user in a form of a local database;

transmitting a material consumption or a shot weight per production cycle, respectively, or an individual or cumulated shot weights for several production cycles or other values indicative of material consumption to the one or more dryers and material containers, directly or indirectly via the production resource or the superordinate controller;

providing each material container on a control side of several loading batches, with time stamps, in a form of a ring buffer and for respectively oldest loading batch residence time results from a difference between a current time of respective material removal by by the production resource or the superordinate controller and a time stamp associated with the oldest loading batch;

keeping the controller or controllers of the dryers or of the material containers respective entries for loading batches, at least time stamps in the form of the ring buffer;

subtracting a current material consumption transmitted by the production resource or the superordinate controller from the respectively oldest loading batch in the ring buffer until the loading batch is completely used up, whereby a next oldest loading batch, that is, a next entry in the ring buffer, is subsequently used for a subtraction calculation;

resulting with a new loading batch for a specific material container from a conveying cycle of bulk material conveyor associated with a loading of the specific material container.

* * * * *